United States Patent
Godlewski et al.

(10) Patent No.: US 8,254,905 B2
(45) Date of Patent: Aug. 28, 2012

(54) SERVICE MONITORING AND DISCONNECTION NOTIFICATION IN A WIRELESS GATEWAY DEVICE

(75) Inventors: Marcin Godlewski, Lawrenceville, GA (US); Arkadiusz Kaliwoda, Zingem (BE)

(73) Assignee: Cisco Technology, Inc., San Jose, CA (US)

( * ) Notice: Subject to any disclaimer, the term of this patent is extended or adjusted under 35 U.S.C. 154(b) by 1086 days.

(21) Appl. No.: 12/168,215

(22) Filed: Jul. 7, 2008

(65) Prior Publication Data

US 2010/0003921 A1  Jan. 7, 2010

(51) Int. Cl.
*H04M 11/00* (2006.01)

(52) U.S. Cl. .............. 455/421; 455/432.1; 455/423; 370/325

(58) Field of Classification Search .......... 455/421, 455/432.1, 423, 422.1, 67.11, 67.7, 41.2, 455/115.3, 163.3; 370/352
See application file for complete search history.

(56) References Cited

U.S. PATENT DOCUMENTS

| | | | |
|---|---|---|---|
| 5,722,068 A * | 2/1998 | Bartle et al. | 455/421 |
| 5,732,347 A * | 3/1998 | Bartle et al. | 455/421 |
| 5,930,684 A * | 7/1999 | Keskitalo et al. | 455/69 |
| 6,018,655 A * | 1/2000 | Bartle et al. | 455/421 |
| 6,173,184 B1 * | 1/2001 | Kikuchi et al. | 455/445 |
| 6,801,521 B1 * | 10/2004 | Shaffer et al. | 370/352 |
| 6,842,621 B2 * | 1/2005 | Labun et al. | 455/456.3 |
| 6,850,499 B2 * | 2/2005 | Wheatley et al. | 370/328 |
| 7,126,937 B2 * | 10/2006 | Crosbie et al. | 370/350 |
| 7,245,609 B2 * | 7/2007 | D'Eletto | 370/352 |
| 8,036,157 B2 * | 10/2011 | Hanabusa et al. | 370/328 |
| 2002/0114303 A1 * | 8/2002 | Crosbie et al. | 370/338 |
| 2003/0003868 A1 * | 1/2003 | Juurikko | 455/41 |
| 2003/0119527 A1 * | 6/2003 | Labun et al. | 455/456 |
| 2005/0094623 A1 * | 5/2005 | D'Eletto | 370/352 |
| 2007/0232307 A1 * | 10/2007 | Ibrahim et al. | 455/436 |
| 2008/0069065 A1 * | 3/2008 | Wu et al. | 370/340 |
| 2011/0096678 A1 * | 4/2011 | Ketonen | 370/252 |

* cited by examiner

*Primary Examiner* — Minh D Dao
(74) *Attorney, Agent, or Firm* — Merchant & Gould

(57) ABSTRACT

A gateway apparatus configured to wirelessly communicate with and provide a service to a wireless client device includes a wireless access point module, a network interface and a controller. The wireless access point module is configured to wirelessly communicate with the wireless client device. The network interface module is configured to interface with a network in order to provide the service for the wireless client device. The controller is responsive to detecting degradation in the service or to receiving a command to generate a signal, for transmission to the wireless client device by the wireless access point module. The signal notifies the wireless client device to disconnect from the gateway apparatus.

24 Claims, 3 Drawing Sheets

US 8,254,905 B2

SERVICE MONITORING AND DISCONNECTION NOTIFICATION IN A WIRELESS GATEWAY DEVICE

BACKGROUND

The present invention relates to wireless gateway devices that operate with a multiple service set in order to provide multiple services to remote wireless client devices, such as in a wireless local area network (WLAN) that operates in accordance with the WiFi™ communication standard.

In a WiFi WLAN, a basic service set (BSS) is the basic building block of service management. A WLAN access point (AP) acts as a master to control the wireless access that stations (clients) have within a BSS. Each BSS is identified by a service set identifier (SSID). Multi-BSS APs have become recently prevalent and currently available multi-BSS AP devices are static. In other words, these devices do not change the BSS state based on the network connection status (e.g., in the event the wide area network (WAN) connection is lost). In this case, for example, wireless devices (e.g., wireless phones, laptops, and wireless audio players) which are connected to an AP whose WAN connection is lost or severely disrupted may lose communications and any active streaming media or other content or data to the wirelessly connected devices is terminated.

Advances in computer networking combined with powerful home computers and modern operating systems have made streaming media practical and affordable for ordinary consumers. For example, stand-alone Internet devices are offering users a "no-computer" option for listening to and viewing audio and video streams. As demand for wireless communications and streaming multimedia services (e.g., voice over internet protocol (VOIP), streaming audio, and streaming video) grows, there is a need for multi-BSS WiFi network equipment capable of providing better service availability and reliability.

DESCRIPTION OF EXAMPLE EMBODIMENTS

Overview

A gateway apparatus for wirelessly connecting devices to a service provided via a service provider's multi-BSS WiFi network and method of operating the same are provided. The gateway apparatus includes a wireless access point module, a network interface and a controller. The wireless access point module is configured to wirelessly communicate with at least one wireless client device. The network interface module is configured to interface with a network in order to provide a service for the at least one wireless client device. The controller is configured to monitor the service and to generate a signal for transmission to the at least one wireless client device by the wireless access point module. The signal notifies the at least one wireless client device to disconnect from the gateway apparatus. The controller may be configured to generate the signal, for example, in response to detecting a degradation in the service. Furthermore, the controller may be configured to detect reception of a command associated with the provided service and generate the signal, for example, in response to receiving the command.

Figure 1:
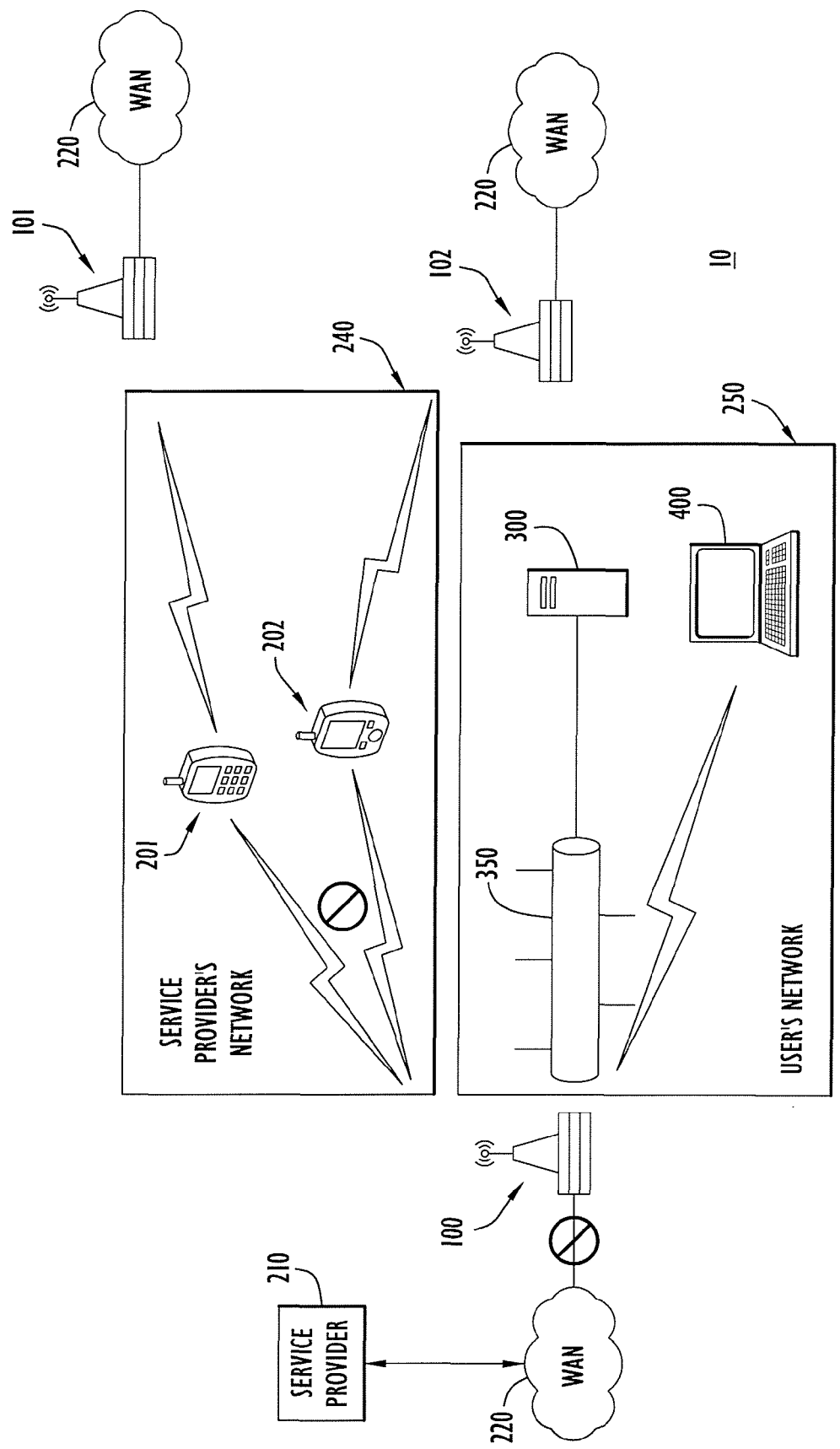
FIG. 1 illustrates an example of a wireless communication environment in which a wireless gateway apparatus is deployed to notify wireless client devices to disconnect from the gateway apparatus.

Referring first to FIG. 1, a wireless communication environment is shown generally at 10 and comprises a wireless gateway apparatus 100 that wirelessly communicates with and provides services to at least one wireless client device, but for the sake of this description, two wireless client devices are shown at reference numerals 201 and 202. The wireless gateway apparatus 100 may reside in a user's home or office, for example. The services provided to wireless client devices 201 and 202 may be services that are offered and managed by a service provider 210 to which the wireless gateway apparatus 100 connects via a wide area network (WAN) 220 (e.g., the Internet). To this end, reference numeral 240 indicates a collection of one or more wireless devices, examples of which are shown at 201 and 202, that form what is referred to as a "service provider's network" since the wireless gateway apparatus 100 serves the devices in the service provider network 240 with the one or more services of the service provider 210. Examples of these services include but are not limited to, a voice over internet protocol (VOIP) communications service, an audio streaming service and a video streaming service.

The gateway apparatus 100 may be operable to provide other services via another network, referred to as a "user's network" shown at 250 (e.g., user's home or office network, or local area network). For example, the user's network 250 may involve providing local networking as well as WAN connectivity for a desktop computer 300 and laptop computer 400. The devices 300 and 400 may connect to the gateway apparatus 100 either wirelessly or via a wire or cable 350 (e.g., Ethernet). The gateway apparatus 100 may also be operable to provide communications between one or more of the wireless client devices 201 and 202 and one or more of the devices 300 and 400.

As mentioned above, the wireless gateway apparatus 100 may reside in a user's home or office, whether that is a single family home, apartment, etc. Very often a wireless client device that is associated and connected to wireless gateway apparatus 100 can also receive signals from other wireless gateway equipment located sufficiently nearby, such as in a neighbor's home. Examples of other wireless gateway equipment are shown at reference numerals 101 and 102, where these other wireless gateway devices 101 and 102 also connect to the WAN 220 and thus can establish connectivity with any entity that has WAN connectivity, such as the service provider 210.

According to the embodiments described herein, the gateway apparatus 100 is configured to monitor the services provided for the service provider 210 to a wireless client device in the service provider's network 240 in order to notify at least one wireless client device to disconnect from the gateway apparatus. For example, the gateway apparatus 100 may be operable to notify the at least one wireless client device to disconnect from the gateway apparatus. Notifying a wireless client device to disconnect from the gateway apparatus may be achieved in many ways. One way is to disable the SSID in the BSS for a particular service used by one or more wireless client devices. Another technique is to transmit a disassociation management frame with a reason code for the disassociation event to one or more wireless client devices associated with a particular SSID or all wireless client devices that are associated with that wireless gateway apparatus (under any SSID).

Figure 2:
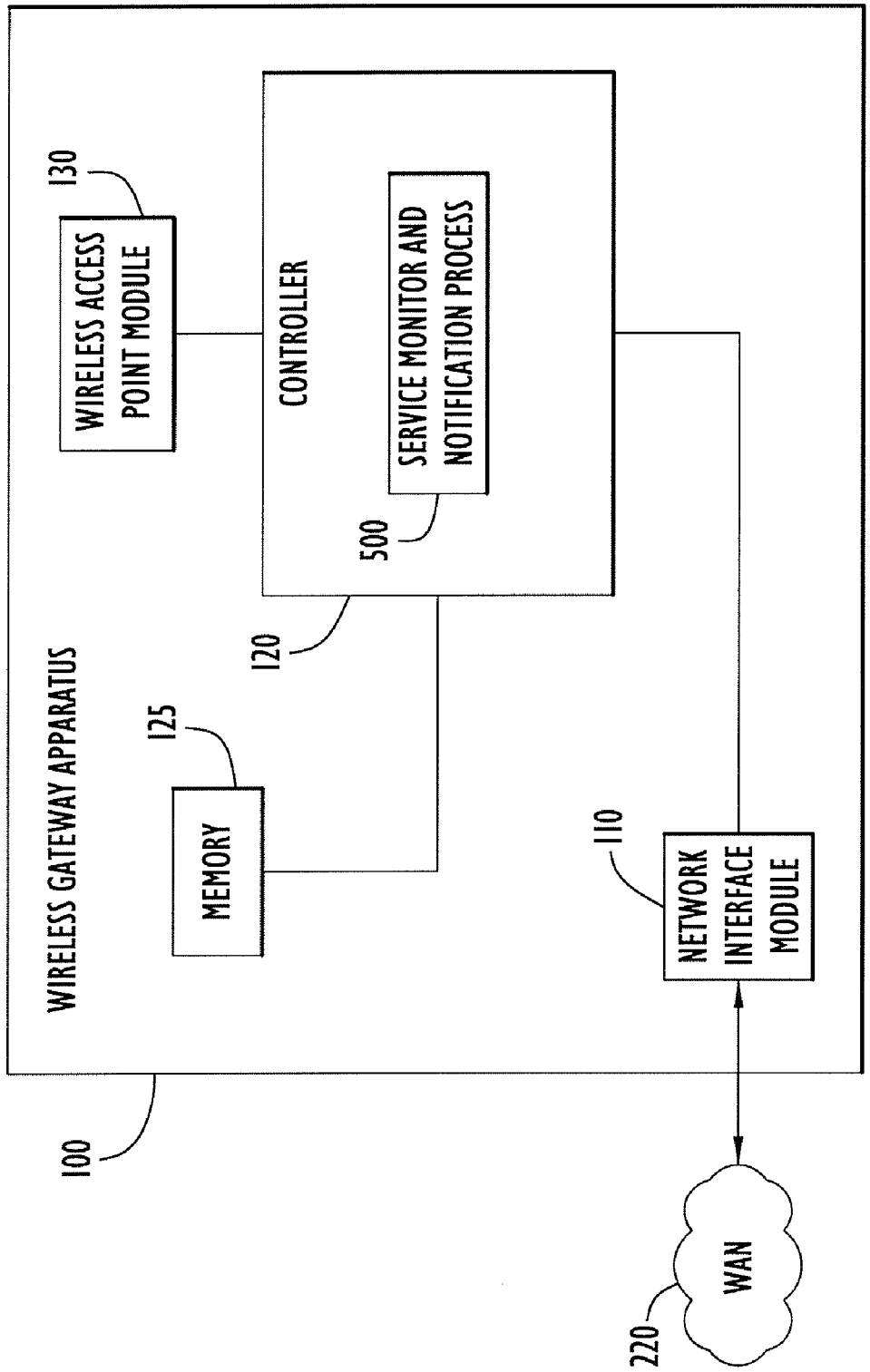
FIG. 2 is an example of a block diagram of a wireless gateway apparatus that is configured to monitor a service and notify a wireless client device to disconnect from the gateway apparatus.

Reference is now made to FIG. 2 that illustrates an example of a block diagram of the wireless gateway apparatus 100. The wireless gateway apparatus 100 comprises a network interface module 110, a controller 120, and a wireless access point module 130. In addition, memory 125 may be provided that stores instructions used to configure and control the functionality of the controller 120. The wireless access point module 130 is configured to wirelessly communicate with one or more wireless client devices, e.g., wireless client devices 201 and 202. For example, the wireless access point module 110 may comprise the components and functionality of a WiFi wireless access point (AP) device. The network interface module 110 is configured to interface with the WAN (e.g., Internet) 220. For example, the network interface module 110 may comprise the components and functionality of an Internet cable modem device, a digital subscriber line (DSL) modem, or a fiber optical interface unit. The controller 120 is configured to control operations of the wireless access point module 130 and the network interface module 110. In addition, the controller 120 is configured to monitor a service that is being provided to a wireless client device, e.g., devices 201 or 202, and to generate a signal for transmission by the wireless access point module 130 to the one or more wireless client devices that are using that service. The signal contains information that informs or otherwise notifies the wireless client device using that service to disconnect from the gateway apparatus 100.

Disconnecting from the gateway apparatus 100 allows the one or more wireless client devices to seek for and wirelessly connect to another gateway apparatus, such as wireless gateway apparatus 101 or 102, configured to provide the service. The controller 120 may be configured to detect a status of the service and generate the signal, for example, in response to detecting a degradation in the service. Furthermore, the controller 120 may be configured to detect reception of a command associated with the provided service and generate the signal, for example, in response to receiving the command. Scenarios involving such commands include but are not limited to, provider initiated disassociation of clients to load balance a multi-BSS network, and provider initiated disassociation of clients to perform routine maintenance (e.g., gateway software upgrades) to the gateway apparatus 100.

Figure 3:
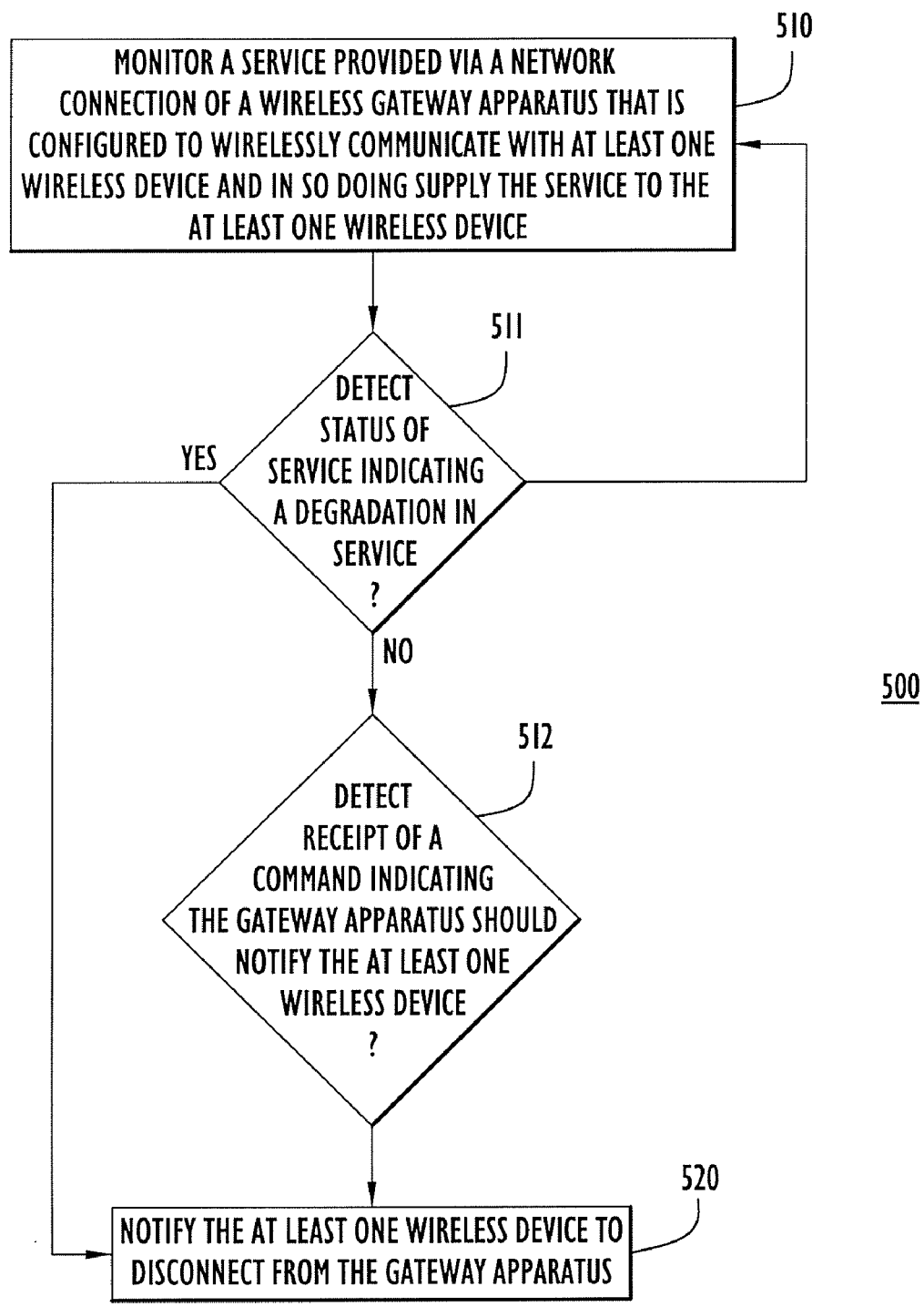
FIG. 3 is an example of a flowchart depicting a method for monitoring a service and notifying a wireless client device to disconnect from the gateway apparatus.

As shown in FIG. 2, with reference to FIG. 3 and with continued reference to FIG. 1, the controller 120 executes a service monitor and notification process shown at reference numeral 500 according to the techniques described herein. The controller 120 of the wireless gateway apparatus 100 may be embodied by any of a variety of processing components. For example, the controller 120 may be a programmable computer or data processor that operates on instructions stored in a memory (e.g., memory 125), or the controller may be embodied by fixed hardware logic. Furthermore, the process 500 may be implemented as programmable logic, e.g., software stored in the memory 125, or as fixed logic as part of a fixed logic hardware processing component forming part or the entire controller 120 (e.g., an application specific integrated circuit). In general, the techniques described herein may be implemented by any type of logic (programmable or fixed) that is configured or encoded in one or more tangible media for execution and when executed, is operable to perform the functions shown in FIG. 3 and other functions described herein.

It is to be understood that the gateway apparatus 100 is operable to communicate with a variety of wireless client devices including, but not limited to, cell phones, personal data assistants (PDA), laptop computers, and MP3 players. Likewise, it is to be understood that the gateway apparatus 100 is operable to provide services using protocols and formats including, but not limited to, Datagram protocols (e.g., UDP, RSTP, RTP, RTCP), Transmission Control protocols (e.g., TCP/IP), Unicast protocols, Multicast protocols (e.g., IP Multicast) and Peer-2-Peer protocols (P2P).

The controller 120 is configured to monitor the service and notify a wireless client device to disconnect from the wireless gateway apparatus 100. The controller 120 may be configured to notify the wireless client device by disabling an SSID associated with that service in a signal that is transmitted to the wireless client device or by sending a disassociation frame in a signal that is transmitted to the at least one wireless device. The controller 120 may be configured to monitor the service in order to detect service non-availability by detecting complete disruption in connectivity to the WAN 220 (e.g., Internet service is down), or detecting a significant degradation in the data rate or connectivity to the WAN 220 such that a particular service is no longer reliable at that reduced data rate. In general, a degradation in service may be based on, but is not limited to, loss of signal (LOS), network latency, packet loss, bit errors, and spurious packets. The circle with the diagonal line through it shown in FIG. 1 is meant to indicate a situation when there is a degradation in a service provided by the wireless gateway apparatus 100 such that it can no longer provide that service to one or more of the wireless client devices it serves, e.g., wireless client device 201 and/or wireless client device 202. The controller 120 may be configured to monitor the service to detect receipt of a command indicating that the gateway apparatus 100 should notify the at least one wireless client device 201, 202 to disconnect from the gateway apparatus 100, for maintenance, load balancing and other purposes.

While FIG. 1 shows that the wireless gateway apparatus 100 connects to the WAN 220 in order to supply services from a service provider 210 to wireless client devices, this is meant by way of example only. The network through which the wireless gateway device 100 need not be a WAN per se, and may be some other network, such as a local area network (LAN), a campus area network (CAN), and a metropolitan area network (MAN). Examples of the controller detecting the status of the service provided include, but are not limited to, error detection per Data Over Cable Service Interface Specifications (DOCSIS), and error detection via periodic packet exchange parameters.

As explained above, the wireless gateway apparatus 100 may be configured to provide multiple services to wireless client devices using multiple SSID within a BSS. For example, each service may be assigned a different SSID within the BSS, e.g., VOIP=SSID1, streaming video=SSID2, streaming video=SSID3, video-on-demand=SSID4, etc. The controller 120 may then be configured to notify a wireless client device that specific service is no longer available by that wireless gateway apparatus using the SSID assigned to that service.

Turning now to FIG. 3, a flow chart is provided that illustrates an example of the service monitor and notification process 500 for operating a wireless gateway apparatus according the techniques described above. At 510, a service provided via a network connection of a wireless gateway apparatus is monitored by any of the techniques described above or other techniques known in the art. At 520, the wireless gateway apparatus transmits a signal to the one or more wireless client devices using that service to notify those wireless client devices to disconnect from the gateway apparatus 100. Disconnecting from the gateway apparatus allows those wireless client devices to seek for and connect to another wireless gateway device in order to continue receiving that service. Monitoring the service may involve detecting a degradation in service 511 or may involve detecting receipt of a command associated with the provided service 512, the command indicating that the wireless gateway apparatus should notify wireless client devices to disconnect from the wireless gateway apparatus. The notification may involve disabling an SSID associated with the service in a signal that is transmitted to the at least one wireless client device, or transmitting a disassociation management frame with a reason code for the disassociation event (e.g., loss of signal).

At 520, using any of the signaling techniques described herein or otherwise known in the art, the gateway apparatus 100 transmits a message that notifies the at least one wireless client device to disconnect from the gateway apparatus 100. When a wireless client disconnects from the gateway apparatus 100, it will scan for other gateway devices that are within range and through which it can receive the service(s) it had been receiving through gateway apparatus 100.

While the foregoing techniques have been described with reference to the WiFi communication standard, this is meant by way of example only. These techniques are applicable to other wireless communication standards, such as the WiMAX™ communication standard.

Although the apparatus, method and logic are illustrated and described herein as embodied in one or more specific examples, it is nevertheless not intended to be limited to the details shown, since various modifications and structural changes may be made therein without departing from the scope of the apparatus, method and logic and within the scope and range of equivalents of the claims. Accordingly, it is appropriate that the appended claims be construed broadly and in a manner consistent with the scope of the apparatus, method and logic, as set forth in the following claims.

What is claimed is:

1. A method comprising:
    monitoring, by a controller, a first service and a second service provided via a network connection of a gateway apparatus that is configured to wirelessly communicate with at least one wireless device and to supply the first service and the second service to the at least one wireless device; and
    notifying the at least one wireless device to disconnect from the gateway apparatus, wherein notifying the at least one wireless to disconnect from the gateway apparatus comprises the controller notifying the at least one wireless device to discontinue the first service and not the second service.

2. The method of claim 1, wherein monitoring comprises detecting a status of the first service and the second service, and notifying is in response to detecting that the status indicates a degradation in the first service.

3. The method of claim 2, further comprising providing the first service and the second service by the gateway apparatus to the at least one wireless device using multiple service set identifiers (SSID) within a basic service set, wherein detecting comprises detecting the status of each of the first service and the second service, each service associated with one of the multiple SSIDs.

4. The method of claim 2, wherein detecting the status of the first service and the second service comprises detecting the status of a wide area network connection.

5. The method of claim 2, wherein detecting the status of the service comprises detecting the status of at least one voice over internet protocol service and a video streaming service.

6. The method of claim 1, wherein monitoring comprises detecting reception of a command associated with the first service and second service, and notifying is in response to receiving the command.

7. The method of claim 1, wherein the controller notifying comprises disabling a service set identifier associated with the first service in a signal that is transmitted to the at least one wireless device.

8. The method of claim 1, wherein the controller notifying comprises sending a disassociation message in a signal that is transmitted to the at least one wireless device.

9. An apparatus comprising:
    a wireless access point module that is configured to wirelessly communicate with at least one wireless device;
    a network interface module that is configured to interface with a network in order to provide a first service and a second service for the at least one wireless device; and
    a controller configured to monitor the first service and the second service and to generate a signal for transmission to the at least one wireless device by the wireless access point module configured to notify the at least one wireless device to disconnect from the gateway apparatus, wherein the signal configured to notify the at least one wireless device to disconnect from the gateway apparatus comprises the signal being configured to notify the at least one wireless device to discontinue the first service and not the second service.

10. The apparatus of claim 9, wherein the controller is further configured to detect a status of the first service and the second service, and to generate the signal in response to detecting that the status indicates a degradation in the first service.

11. The apparatus of claim 10, wherein the controller is configured to detect the status of the first service and the second service on a wide area network.

12. The apparatus of claim 10, wherein the controller is configured to detect the status of the first service and the second service comprises at least one of a voice over internet protocol service and a video streaming service.

13. The apparatus of claim 9, wherein the controller is further configured to notify the at least one wireless device by disabling a service set identifier associated with the first service in a signal that is transmitted to the at least one wireless device.

14. The apparatus of claim 9, wherein the controller is further configured to notify the at least one wireless device by generating a disassociation message for transmission to the at least one wireless device.

15. The apparatus of claim 9, wherein the controller is configured to provide the first service and the second service to the at least one wireless device using multiple service set identifiers within a basic service set.

16. The apparatus of claim 9, wherein the controller is further configured to detect receipt of a command associated with the first service and the second service and generate the signal in response to receiving the command.

17. A non-transitory tangible computer medium storing encoded logic at a controller for execution and when executed operable to:
    monitor a first service and a second serviced provided via a network connection of a gateway apparatus configured to wirelessly communicate with at least one wireless device; and
    generate a notification for transmission to the at least one wireless device to notify the at least one wireless device to disconnect from the gateway apparatus, wherein generating the notification for transmission to the at least one wireless device to notify the at least one wireless device to disconnect from the gateway apparatus comprises generating the notification to notify the at least one wireless device to discontinue the first service and not the second service.

18. The non-transitory tangible computer medium of claim 17, wherein the logic that monitors comprises logic configured to detect a status of the first service and the second service, and the logic that generates the notification is responsive to detecting that the status indicates a degradation in the first service.

19. The non-transitory tangible computer medium of claim 18, wherein the logic that monitors the first service and the second service comprises logic that detects a status of a wide area network connection.

20. The non-transitory tangible computer medium of claim 18, wherein the logic that monitors comprises logic that detects the status of the first service and the second service provided by the gateway apparatus using multiple service set identifiers within a basic service set.

21. The non-transitory tangible computer medium of claim 18, wherein the logic that monitors comprises logic that detects the status of the first service and the second service indicating the status of the first service and the second service comprises at least one of a voice over internet protocol service and a video streaming service.

22. The non-transitory tangible computer medium of claim 17, wherein the logic that monitors comprises logic that detects receipt of a command associated with the first service and the second service, and wherein the logic that notifies is responsive to receiving the command.

23. The non-transitory tangible computer medium of claim 17, wherein the logic that generates the notification comprises logic that disables a service set identifier associated with the first service in a signal that is transmitted to the at least one wireless device.

24. The non-transitory tangible computer medium of claim 17, wherein the logic that generates the notification comprises logic that generates a disassociation message for transmission to the at least one wireless device.

* * * * *